United States Patent [19]
Jencks et al.

[11] Patent Number: 5,287,087
[45] Date of Patent: Feb. 15, 1994

[54] SOLENOID ENERGIZATION INDICATOR

[75] Inventors: David C. Jencks, Pleasant Ridge; Larry A. Williamson, Farmington Hills, both of Mich.

[73] Assignee: Detroit Coil Company, Ferndale, Mich.

[21] Appl. No.: 898,464

[22] Filed: Jun. 15, 1992

[51] Int. Cl.⁵ ............................................. G08B 21/00
[52] U.S. Cl. ................................... 340/644; 340/654; 340/664; 324/127; 324/133; 335/17
[58] Field of Search ............... 340/635, 638, 653, 654, 340/664, 644; 324/127, 133; 335/2, 17

[56] References Cited
U.S. PATENT DOCUMENTS

| | | |
|---|---|---|
| 2,591,336 | 4/1952 | Bordelon . |
| 2,611,843 | 9/1952 | Bourne . |
| 3,028,587 | 4/1962 | Vaccaro ........................... 340/664 X |
| 3,316,447 | 10/1960 | Hochstein . |
| 3,488,611 | 1/1970 | Harper ................................ 335/170 |
| 3,909,670 | 9/1975 | Wakamatsu et al. . |
| 4,259,545 | 3/1981 | Hayden ............................ 324/133 X |
| 4,342,973 | 8/1982 | Stone et al. ..................... 340/654 X |
| 4,558,310 | 12/1985 | McAllise ......................... 324/133 X |
| 5,015,944 | 5/1991 | Bubash ............................ 340/664 X |

*Primary Examiner*—Jeffrey Hofsass
*Attorney, Agent, or Firm*—Brooks & Kushman

[57] ABSTRACT

An energization indicator for a solenoid includes an electrically operable signaler (70) having a coil (72) for energizing the signaler (70) when a magnetic flux field sweeps such coil, with the coil (72) being mounted in the magnetic flux path of the solenoid coil (53).

4 Claims, 2 Drawing Sheets

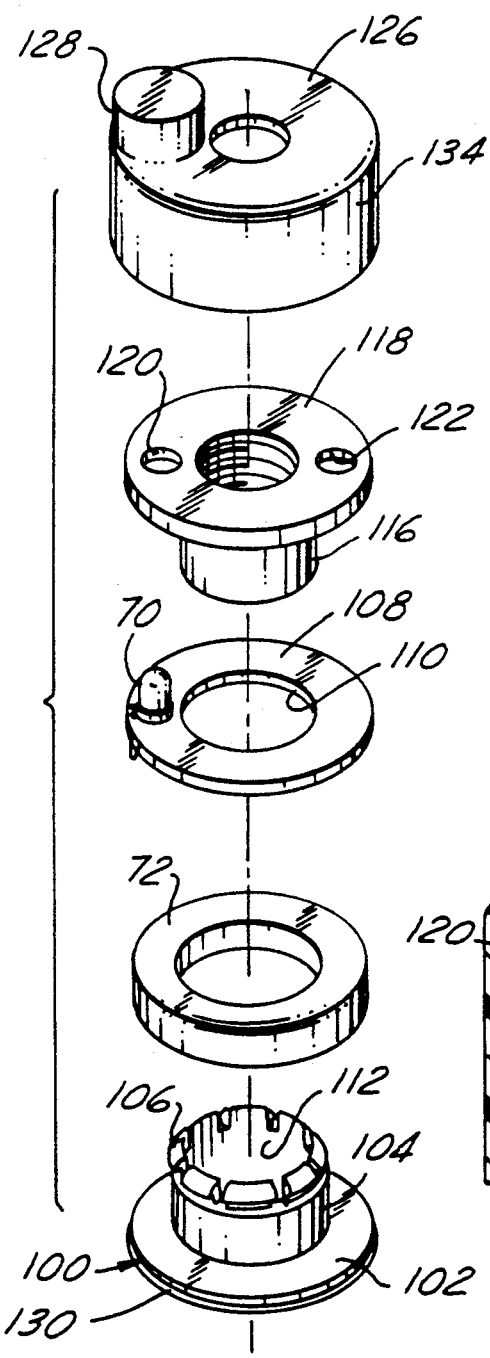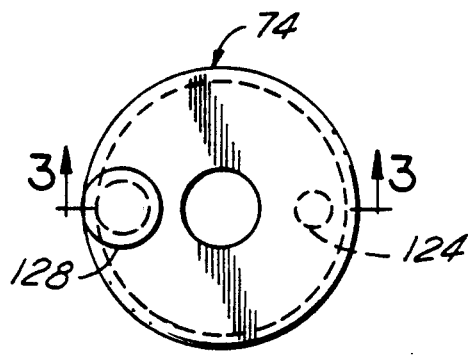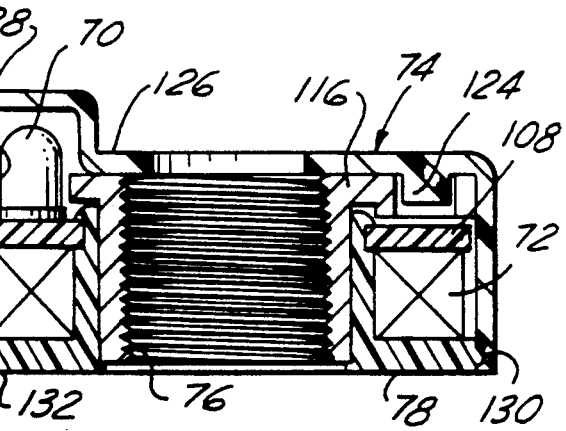

SOLENOID ENERGIZATION INDICATOR

FIELD OF INVENTION

This invention relates to an energization indicator, such as a pilot light, for solenoids and in particular to such an indicator which operates on the voltage induced from the solenoid coil.

BACKGROUND OF THE INVENTION

During inspection or servicing of pneumatic or hydraulic systems employing solenoid-operated pilot valves, it is often desirable to be able to determine if a particular pilot valve solenoid is actually electrically energized as and when it is supposed to be. Sensing the electrical condition of such solenoids has heretofore been accomplished by either inserting a suitable detector in the solenoid circuit at the time of the inspection, such as by disconnecting a wire at the solenoid and temporarily connecting in a meter, or by having a light permanently wired in the solenoid circuit. The first approach was time consuming and the second substantially raised the initial cost of the solenoid.

The following prior art U.S. patents show sensing devices either hard wired into a switch or solenoid circuit or inductively coupled with a carrying wire:

U.S. Pat. No. 2,591,336
U.S. Pat. No. 2,611,843
U.S. Pat. No. 3,316,447
U.S. Pat. No. 3,488,611
U.S. Pat. No. 3,909,670
U.S. Pat. No. 5,015,944

SUMMARY OF THE INVENTION

A solenoid pilot light comprising a lamp connected to an inductance coil is mounted on a solenoid so that the inductance coil is inductively coupled with the solenoid coil whereby upon energizing the solenoid the lamp is inductively illuminated. In a preferred embodiment, the lamp and inductance coil are compactly arranged and housed as a unit which may be used on the pilot valve solenoid in place of the solenoid retaining nut. In such embodiment the pilot light may be offered as an aftermarket item to replace retaining nuts on pilot valves in the field.

BRIEF DESCRIPTION OF THE DRAWINGS

FIG. 1 is a top view of the energization indicator;

FIG. 2 is an exploded view of the energization indicator;

FIG. 3 is a cross-sectional view taken on the line 3—3 of FIG. 1;

BRIEF DESCRIPTION OF THE PREFERRED EMBODIMENT

Figure 4:
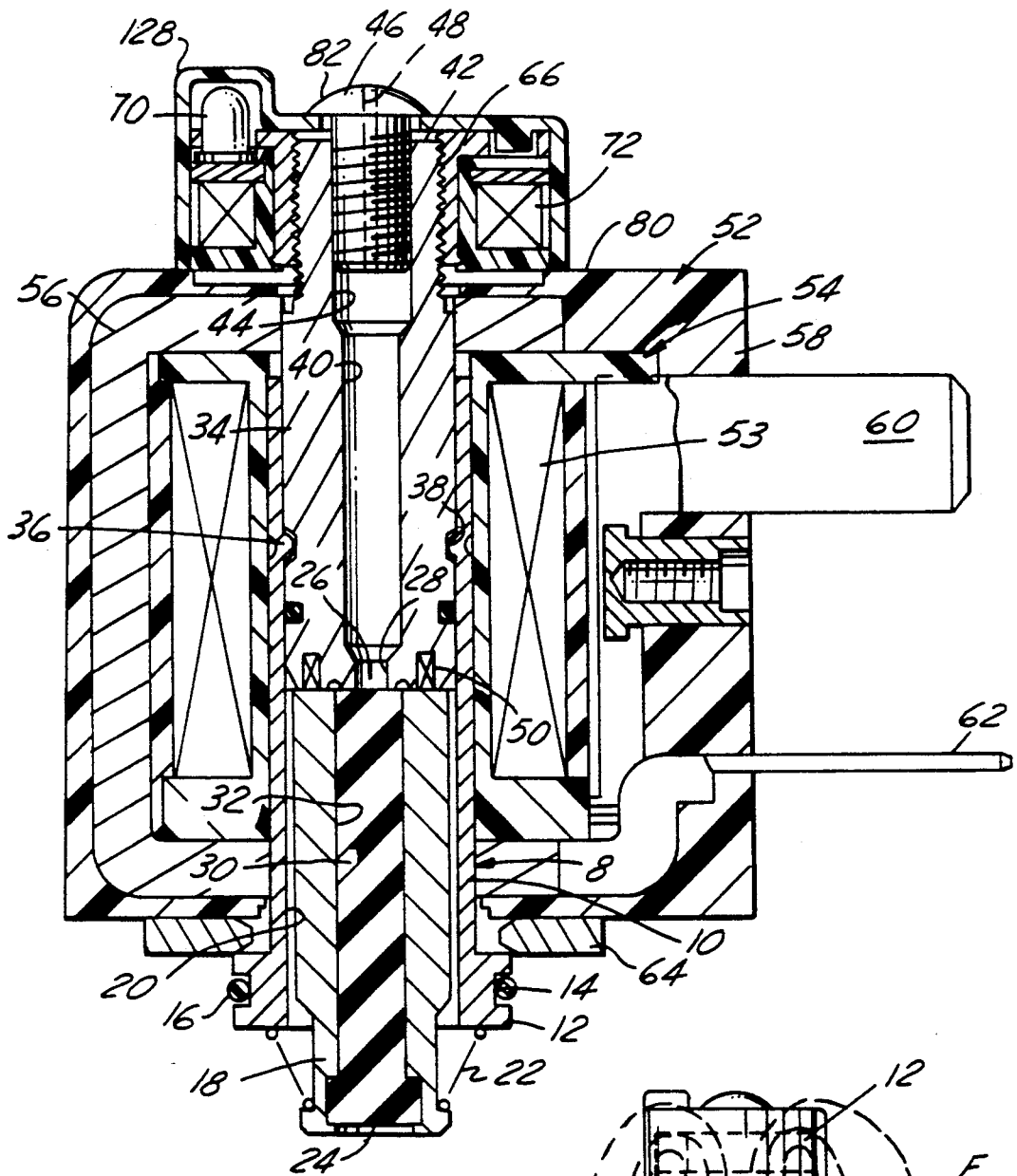
FIG. 4 is a vertical cross-sectional view taken through the solenoid portion of a pilot valve assembly showing the energization indicator in place thereon.

As shown in FIG. 4, a typical pilot valve solenoid comprises a cylindrical plunger post 8 having a brass tube portion 10, the proximal end of which is enlarged with a boss-like flange 12 encircled by a groove 14 within which is disposed an O-ring 16 for sealing the boss and in turn the plunger post within the pilot valve, not shown. The solenoid plunger 18 is disposed within the bore 20 of the tube portion 10 for limited reciprocation and may be biased outwardly by a spring 22. The plunger is provided with elastomeric valve faces 24 and 26 at opposite ends, the former for sealing against an orifice (not shown) in the pilot valve, and the latter for sealing the orifice at 28 within the post. These valve faces may be provided by opposite ends of an elastomeric insert 30 disposed within a hollow bore 32 in the plunger 18.

The plunger post 8 is provided with a stop portion 34 received within the tubular portion 10 and secured by an indentation as at 36, which cooperates with a groove 38 in the stop. A fluid passageway 40 in the stop opens at its lower end through the orifice 28 and at its upper end through the distal end 42 of the post. The bore 40 may be enlarged as at 44 and threaded to receive a screw 46 which is axially bored as at 48 to allow the passage of fluid axially through the screw whereby fluid within the bore 40 may escape outwardly of the post. It will be noted the plunger 18 has a clearance between its external cylindrical surface and the bore 20 of the post so that fluid from the pilot valve may escape around the plunger and through the orifice 28 when the plunger is spaced downwardly from the orifice 28.

The plunger stop may include a shading coil 50 disposed circumaxially around the orifice 28 to provide for a quiet holding of the plunger against the orifice when the solenoid is energized.

Removably telescoped over the plunger post 18 and its plunger stop 34 is the solenoid coil assembly 52. The assembly comprises a solenoid coil 53 and bobbin generally indicated by the reference numeral 54, a steel solenoid frame 56 of generally C-shaped configuration which embraces the coil and bobbin and overlies opposite ends thereof. The coil and bobbin 54 and frame 56 are encapsulated within a plastic encapsulating medium 58 which integrates these parts as a unitary assembly. A pair of electric contact blades 60 (only one of which is shown) are connected to opposite ends of the solenoid coil to be connected in an alternating current circuit for energizing the coil. A third contact blade 62 is connected to the solenoid frame as a ground. These blades are suitably encapsulated by the encapsulating medium 58.

The plunger post and plunger stop may be held to the pilot valve by a clamp plate 64 which is telescoped down over the post and bears against the boss or flange 12. Suitable fasteners, not shown, may be passed through the plate 64 and threaded into the pilot valve to secure the post thereto with the O-ring 16 effecting the seal between the post and valve. The coil assembly 52 is telescoped over the post 8 and rests upon the plate 64 as shown in FIG. 4.

The coil assembly 52 is normally held on the plunger post 8 and its outwardly projecting plunger stop portion 34 by a hold-down nut (not shown) which is internally threaded and is threadedly engaged over external threads 66 on the distal end of the plunger post. By removing such nut, the coil assembly 52 may be simply withdrawn off the post. With the hold-down nut tightened down against the coil assembly 52, the assembly is held securely on the post. The invention disclosed herein is intended to replace such nut and permits the mechanic to readily determine whether the pilot valve has been energized.

In general the invention comprises an electrically operable signaller 70, shown herein in the form of an electric lamp, such as an LED. A signaller coil 72 electrically connected to the signaller or lamp is operable to activate the signaller when the magnetic flux from coil assembly 54 sweeps the coil 72. Housing means 74 are provided which protectively enclose or encapsulate the signaller coil 72 and provide a mounting or support for the lamp 70, as best shown in FIG. 3. The housing means includes an axially extending aperture 76 (see FIG. 3) which opens through an end face 78. The aperture or bore 76 is intended to be received over the distal end 42 of the plunger post whereby the coil 72 surrounds the post and the end face 78 can bear against the upwardly disposed surface 80 of the solenoid coil assembly 52. The signaller assembly may be held on the plunger post either by having the bore or aperture 76 threaded as shown in FIG. 3, or the screw 46 shown in FIG. 4 may have an enlarged head portion 82 which will overlie the housing means 74 to hold the housing means downwardly against the surface 80 of the coil assembly 52. In the latter case, the threads in the bore or aperture 76 may be eliminated and similarly the threads 66 on the distal end of the plunger stop may be eliminated. Either approach to holding the signaller assembly on the distal end of the plunger stop may be utilized. It is generally intended, however, that the signaller assembly will simply replace the pre-existing nut normally used to retain the solenoid assembly 52 on the distal end of the post.

More specifically, the signaller assembly includes a bobbin 100, as shown in FIG. 2, having a flange 102 and a central cylindrical body 104 integral with the flange and terminating in resilient teeth 106 arranged in a circular configuration as shown in FIG. 2 and over which may be snapped a circuit board 108 carrying the LED 70. In practice, the circuit board 108 may be snapped on to the bobbin before the wire coil is wound thereon. The coil is shown schematically in FIG. 2 as a donut 72. Ends of the coil wire are secured to pigtails on the lamp 70 in a well-understood fashion. Circuit board 108 has a central aperture 110, and the body 104 of the bobbin has a bore 112 and downwardly through the aperture 110 and the bore 112 is received the cylindrical nut 116 having a flange 118 which overlies and bears against the upper face of the circuit board 108. For this purpose the flange 118 of the nut is provided with a through aperture 120 which is telescoped over the lamp 70. The lamp projects upwardly through the aperture 120 as best shown in FIG. 3.

Diametrically opposite aperture 120 is an aperture 122 for receiving the downwardly projecting ear 124 of the plastic cap 126, to allow torque driving between the cap and the nut 116. The cap 126 is either transparent or at least has a transparent lens portion 128 allowing light from the lamp 70 to shine through the cap. The cap 126 may be snapped on to the flange 102 of the bobbin by providing the periphery of the flange 102 with a small peripheral rib 130 which engages within a corresponding internal peripheral groove 132 in the lower edge of the cap.

The exterior 134 of the cylindrical surface of the cap may be knurled to facilitate finger tightening of the signaller assembly on the threaded distal end of the plunger stop. The cap 126 may be either molded in a two-shot molding technique where the body of the cap is opaque and the lens portion 128 is translucent or transparent, or the cap may be formed with the lens portion 128 secured to the body of the cap after both portions have been molded.

Figure 5:
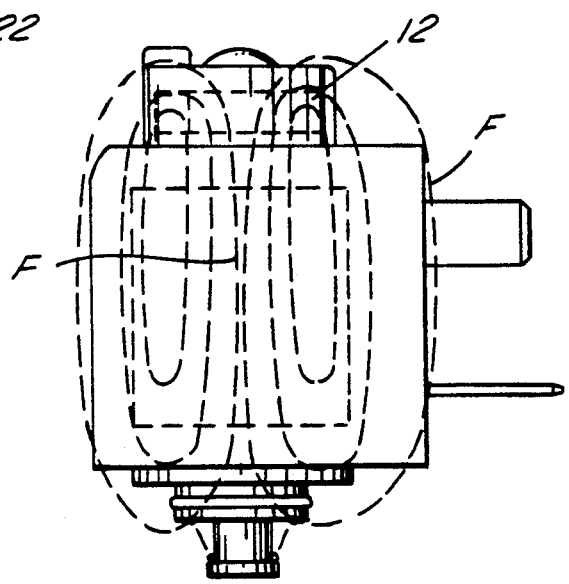
FIG. 5 schematically illustrates the lines of flux created by energization of the pilot valve solenoid.

The nut 116 may be steel for conducting magnetic flux F up through the center of the signaller coil 72 as best shown in FIG. 5. As these flux lines cut across the signaller coil 72, they induce a voltage in such coil causing illumination of the LED or lamp 70, which is then visible to the mechanic through the transparent or translucent lens portion 128 of the cap 126, and indicates that the solenoid coil 54 is energized.

While a lamp 70 is shown as the energization indicator, it will be understood that any other suitable signaller may be utilized including a circuit connected to a control panel or a portion of a telemetry redundancy system.

We claim:

1. An energization indicator for use with a solenoid having an encapsulated coil assembly containing a solenoid coil for creating a flux field and an aperture extending axially through the coil and opening through opposite ends of the assembly for mounting on a solenoid plunger post having a threaded end, comprising:
    an indicator lamp;
    a lamp coil electrically connected to the lamp for illuminating the same when a flux field sweeps the lamp coil;
    means protectively enclosing the lamp coil and providing support for the lamp;
    said means defining an aperture extending axially through the lamp coil to allow telescoping engagement with said plunger post;
    means threadedly engaged with the threaded end of the plunger post for holding the lamp coil and lamp on the plunger post; and
    said means protectively enclosing the lamp coil being receivable over the plunger post to bear against the coil assembly and hold the same on the post with the lamp coil disposed in a position to be swept by the flux field of the solenoid coil whereby the lamp is illuminated when the solenoid coil is energized.

2. The invention of claim 1 wherein said means protectively enclosing the lamp coil also protectively encloses the lamp, and is translucent adjacent the lamp.

3. The invention defined by claim 2 wherein said means protectively enclosing the lamp is internally threaded for threaded engagement with the threaded end of the plunger post.

4. The invention defined by claim 2 wherein said means protectively enclosing the lamp coil is opaque except for the translucent portion adjacent the lamp.

* * * * *